US012601849B2

(12) United States Patent　　(10) Patent No.:　US 12,601,849 B2
Crook et al.　　(45) Date of Patent:　Apr. 14, 2026

(54) SYSTEMS AND METHODS FOR PLANNING SEISMIC DATA ACQUISITION WITH REDUCED ENVIRONMENTAL IMPACT

(71) Applicant: OPTISEIS SOLUTIONS LTD., Calgary (CA)

(72) Inventors: Andrea Crook, Calgary (CA); Shane Bossaer, Calgary (CA)

(73) Assignee: OptiSeis Solutions Ltd., Calgary AB (CA)

( * ) Notice: Subject to any disclaimer, the term of this patent is extended or adjusted under 35 U.S.C. 154(b) by 0 days.

(21) Appl. No.: 18/028,597

(22) PCT Filed: Mar. 1, 2023

(86) PCT No.: PCT/CA2023/050266
§ 371 (c)(1),
(2) Date: Mar. 27, 2023

(87) PCT Pub. No.: WO2023/178411
PCT Pub. Date: Sep. 28, 2023

(65) Prior Publication Data
US 2024/0393486 A1　　Nov. 28, 2024

Related U.S. Application Data

(60) Provisional application No. 63/323,604, filed on Mar. 25, 2022.

(51) Int. Cl.
*G01V 1/00*　　(2024.01)
(52) U.S. Cl.
CPC .......... *G01V 1/003* (2013.01); *G01V 2210/16* (2013.01)

(58) Field of Classification Search
CPC .............. G01V 1/003; G01V 2210/16; G01V 2210/121; G01V 2210/1293; G01V 2210/1295
See application file for complete search history.

(56) References Cited

U.S. PATENT DOCUMENTS

| | | | |
|---|---|---|---|
| 5,991,238 A * | 11/1999 | Barr ...................... | G01V 1/364 |
| | | | 367/24 |
| 6,691,075 B1 | 2/2004 | Winbow et al. | |
| 8,073,625 B2 * | 12/2011 | Deffenbaugh ........... | G01V 1/28 |
| | | | 702/14 |
| 10,156,648 B1 | 12/2018 | Jiang | |
| 10,317,542 B1 | 6/2019 | Jiang | |
| 10,809,402 B2 | 10/2020 | Li et al. | |

(Continued)

OTHER PUBLICATIONS

WO PCT/CA2023/050266 IPRP, Sep. 24, 2024, Optiseis Solutions Ltd.

(Continued)

*Primary Examiner* — Mohammad K Islam
(74) *Attorney, Agent, or Firm* — Wells St. John P.S.

(57) ABSTRACT

The invention relates to systems and methods for designing seismic surveys to enable seismic data acquisition with a reduced environmental impact and lower survey costs. The methods include incorporating surface and subsurface data and associated parameters for a proposed survey area and assigning weighting values to the relative ranking of the parameters for a particular area and thereafter designing a source/receiver plan based on combined and weighted parameters.

19 Claims, 15 Drawing Sheets

(56)                References Cited

U.S. PATENT DOCUMENTS

| | | | | |
|---|---|---|---|---|
| 10,823,867 | B2 | 11/2020 | Eick et al. | |
| 11,269,092 | B2 | 3/2022 | Hardouin et al. | |
| 12,313,801 | B2 * | 5/2025 | Kumar | G01V 1/307 |
| 2006/0190181 | A1 * | 8/2006 | Deffenbaugh | G01V 1/28 702/14 |
| 2009/0005992 | A1 * | 1/2009 | Alumbaugh | G01V 3/30 702/7 |
| 2011/0120724 | A1 * | 5/2011 | Krohn | G01V 1/30 703/2 |
| 2011/0137569 | A1 * | 6/2011 | Deffenbaugh | G01V 1/28 702/16 |
| 2015/0124560 | A1 | 5/2015 | Chengbo et al. | |
| 2017/0115417 | A1 * | 4/2017 | van Groenestijn | G01V 1/3808 |
| 2018/0023385 | A1 * | 1/2018 | Bang | G01V 1/40 175/45 |
| 2019/0136652 | A1 * | 5/2019 | Vail, III | E21B 21/08 |
| 2021/0389488 | A1 * | 12/2021 | Alwusaibie | G01V 1/30 |
| 2024/0418882 | A1 | 12/2024 | Crook et al. | |
| 2025/0200256 | A1 * | 6/2025 | Kenter | G01V 20/00 |

OTHER PUBLICATIONS

WO PCT/CA2023/050266 Search Rept., May 8, 2023, Optiseis Solutions Ltd.

WO PCT/CA2023/050266 Writ. Opin, May 8, 2023, Optiseis Solutions Ltd.

Candes et al., "An Introduction to Compressive Sampling", IEEE Signal Processing Magazine, Mar. 2008, United States, 10 pages.

Crook et al., U.S. Appl. No. 63/323,604, filed Mar. 25, 2022, titled "Systems and Methods for Planning Seismic Data Acquisition with Reduced Environmental Impact", 35 pages.

Gibson et al., "Promoting Environmental Responsibility in Seismic Operations", Oilfield Review, Summer 2003, United States, pp. 10-21.

Hennenfent et al., "Simply Denoise: Wavefield Reconstruction Via Jittered Undersampling", Geophysics vol. 73, No. 3, May-Jun. 2008, United States, pp. V19-V28.

Naghizadeh et al., "On Sampling Functions and Fourier Reconstruction Methods", Geophysics vol. 75, No. 6, Nov.-Dec. 2010, United States, pp. WB137-WB151.

Naghizadeh, "Double-Weave 3D Seismic Acquisition—Part 1: Sampling and Sparse Fourier Reconstruction", Geophysics vol. 80, No. 6, Nov.-Dec. 2015, United States, pp. WD143-WD162.

Naghizadeh, "Double-Weave 3D Seismic Acquisition—Part 2: Seismic Modeling and Subsurface Fold Analyses", Geophysics vol. 80, No. 6, Nov.-Dec. 2015, United States, pp. WD163-WD173.

Sweeney et al., "Integrating Environmental Impact Evaluation into a Quality, Health, Safety, and Environmental Management System,", SPE International, 74009, 2002, United States, 8 pages.

Dean et al., "An automated survey design process to reduce the environmental impact of onshore seismic surveys". The Leading Edge, Nov. 2022 (Nov. 2022), pp. 786-791 Abstract pp. 786-789 Figs. 9 and 13.

Crook et al., "Reducing the Environmental Impact of Acquiring Shallow Seismic Surveys Via Alternative Ceometries". Second EAGE Conference on Near Surface in Latin America, Nov. 2022 (Nov. 2022), vol. 2022, pp. 1-5 Whole document.

* cited by examiner

20

20a

SYSTEMS AND METHODS FOR PLANNING SEISMIC DATA ACQUISITION WITH REDUCED ENVIRONMENTAL IMPACT

RELATED PATENT DATA

This application is a 35 U.S.C. § 371 of and claims priority to PCT International Application Number PCT/CA2023/050266, filed 1 Mar. 2023, which was published in English, and which claims priority to and the benefit of U.S. Provisional patent application Ser. No. 63/323,604, filed 25 Mar. 2022, and the teachings of which are incorporated herein by reference.

FIELD OF THE INVENTION

The invention relates to systems and methods for designing seismic surveys to enable seismic data acquisition with a reduced environmental impact and lower survey costs. The methods include incorporating surface and subsurface data and associated parameters for a proposed survey area and assigning weighting values to the relative ranking of the parameters for a particular area and thereafter designing a source/receiver plan based on combined and weighted parameters.

BACKGROUND OF THE INVENTION

Seismic surveys are a method of exploration geophysics used to estimate the properties of the Earth's subsurface from reflected seismic waves. Generally, seismic surveys are conducted across survey areas wherein seismic data is acquired by imparting a seismic source of energy into the ground and then listening for reflected energy at a number of nearby receivers.

Seismic waves are mechanical perturbations that travel in the Earth at a speed governed by the acoustic properties of the medium in which they are travelling. The acoustic (or seismic) impedance of a medium, Z, is defined by the equation:

$$Z=v\rho$$

where v is the seismic wave velocity and $\rho$ (rho) is the density of the rock.

When a seismic wave travelling through the Earth encounters an interface between two materials with different acoustic impedances, some of the wave energy will reflect off the interface and some will refract through the interface. Thus, and fundamentally, the seismic reflection technique consists of generating seismic waves and measuring the time taken for the waves to travel from the source, reflect off an interface and be detected by the array of receivers at the surface.

Knowing travel times from the source to various receivers, and the velocity of the seismic waves, software is used to reconstruct the pathways of the waves to build up an image of the subsurface.

Seismic surveys are conducted over wide areas of land and water as a means of understanding underlying geological formations.

Currently, almost all oil and gas exploratory wells are preceded by a seismic survey including for example any one of or a combination of a 2D, 3D, 4D, VSP, borehole, microseismic and/or passive surveys, amongst others.

The basic method of a 3D survey is the same as for a 2D survey; however, in a 3D survey, instead of a single line of energy source points and receiver points, the source points and receiver points are laid out in a grid across the ground surface. As a result, recorded reflections that are received at each receiver point come from all directions, requiring sophisticated computer programs to analyze this data to create a three-dimensional image of the subsurface.

As noted, 3D surveys are acquired by laying out energy source points and receiver points in a grid over the land area to be surveyed. The receiver points are set to record the reflected vibrations from the source points and are typically laid out in parallel lines (receiver lines). The source points are also laid out in parallel lines that are generally perpendicular to the receiver lines. The spacing of the source and receiver points and lines is determined by the design and objectives of the survey.

Energy sources for a seismic survey are most commonly either subsurface explosive charges or surface Vibroseis for land data and airgun for marine data, although a seismic survey is not limited to using these specific energy sources, only that the seismic energy input into the subsurface needs to be sufficient to travel downwards and reflect off the target of interest and return to surface with sufficient energy to be distinguished from background noise.

3D surveys are conducted over a large area in order to provide sufficient data for accurate interpretation of the subsurface geology, Surveys are conducted over all types of land including rural land and remote land. Depending on the location, any type of surface feature may be present on the surface including any type of forest, vegetation and/or man-made features. Conducting a survey requires the physical placement of sources and receivers at known locations. Given the need to prepare ground to ensure safe placement of sources and receivers, each source and receiver requires access to specific ground locations by both personnel and heavy equipment. Moving teams of personnel and equipment deep into remote and untouched land is challenging, requiring cut-lines to be cut through forest to enable this access.

In the past, when a survey was being planned, source and receiver lines were most often designed orthogonal to one another, which has an impact on the environment. That is, machinery would be deployed to the field and would cut broad and uniform lines through forest/vegetation and/or plow/push lines through various habitats to enable the source and receiver lines to be set up. Seismic programs typically involve cutting continuous lines 1.75 m to 4 m wide, which often results in cutting 10-25% of the total program area.

The environmental impact as a result of this approach can persist in many areas. Depending on the types of forest/vegetation and their growing seasons, the footprint from a seismic survey may persist for decades, particularly in areas where re-growth is extremely slow.

There are other environmental factors, including the effect on wildlife habitats, as a result of the fragmentation of forests stemming from a seismic survey. For example, cut-lines can affect how predators move through forests/vegetation, which can place added stress on non-predator populations.

Another problem are the surface features present within a defined land area. Surface features including forests, lakes or waterways, and buildings and other man-made structures can complicate placement of seismic sources and receivers. Seismic methodologies and geometry solutions need to account for movement around these features.

In response, LIS (low impact seismic) has been developed which uses a narrower width of cut-lines to reduce the environmental impact of seismic acquisition. Miniaturized sources have also been developed to reduce the impact related to sources specifically. Surveys in sensitive areas may also be intentionally acquired using a larger line interval (spacing between parallel lines) than would normally be used if the area was not sensitive; however, larger line intervals can significantly reduce the data quality of the resulting seismic.

Other techniques, including helicopter deployment of equipment or miniaturized equipment can result in reduction in environmental impact but are costly to implement. Utilizing miniaturized equipment may require narrower line widths without changing the distribution of the lines within a seismic program. One approach to using miniaturized equipment is to cut seismic lines at a narrower width. For example, this type of program would have approximately 22% reduction in total line clearing if the width of the source line was changed from 2.75 m to 1.75 m, but would still utilize the same amount of equipment and provides no cost savings.

LIS seismic still requires cutting more forest area than is desired in many areas and/or can cause an undesirable reduction in seismic data quality if the line spacings are simply increased.

Accordingly, there continues to be a need for improved seismic technology that can reduce both the environmental impact and the cost of acquiring good quality seismic data.

SUMMARY OF THE INVENTION

In accordance with the invention, there is provided a seismic survey design method comprising the steps of: for a defined land and/or marine area: a) obtaining two or more data sets for the defined land and/or marine area wherein each data set includes relative ranking values for sub-zones within the defined area; b) over-layering two or more data sets; and, c) for a defined resolution of the over-layered data sets, applying a weighting factor to each relative ranking value for each data layer and summing weighted ranking values across all over-layered data sets to determine a combined weighted ranking value for the resolution.

In one embodiment, the invention further includes the step of filtering combined weighted ranking values into two or more categories and applying different survey geometries to each category.

In one embodiment, survey geometries are applied to correlate larger combined weighted ranking values to a survey geometry having less disturbance as compared to smaller combined weighted ranking values to a survey geometry having more disturbance.

In another embodiment, survey geometries are applied to correlate larger combined weighted ranking values to a survey geometry having fewer sources and receivers as compared to smaller combined weighted ranking values to a survey geometry having more sources and receivers.

In various embodiments, the survey geometries are selected from survey geometries including: orthogonal and separate source and receiver lines having intersecting lines between the source and receiver lines; and non-linear source and receiver lines having non-intersecting lines between adjacent non-linear lines and wherein the survey geometries are ordered from least sensitive to most sensitive.

In one embodiment, the method includes the step of creating a survey design for the defined area, the survey design having a plurality of survey geometries applied to different sub-zones of the defined area.

In yet another embodiment, the method incudes the step of filtering the survey design to reduce complexity of transitions from one survey geometry to another.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

With reference to the figures, systems and methods for seismic survey planning and implementation are described. The systems and methods described enable improved survey planning and design of seismic surveys to reduce the environmental impact of acquiring seismic data in survey areas including sensitive ecological environments and/or reduce the cost of acquiring seismic, while matching or exceeding the resulting data quality of a conventional seismic program. Specifically, the systems and methods enable the design of surveys that provide for a reduction in the total cut area and the linear distance of cut-lines in a program area compared to conventional LIS seismic.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Figure 1:
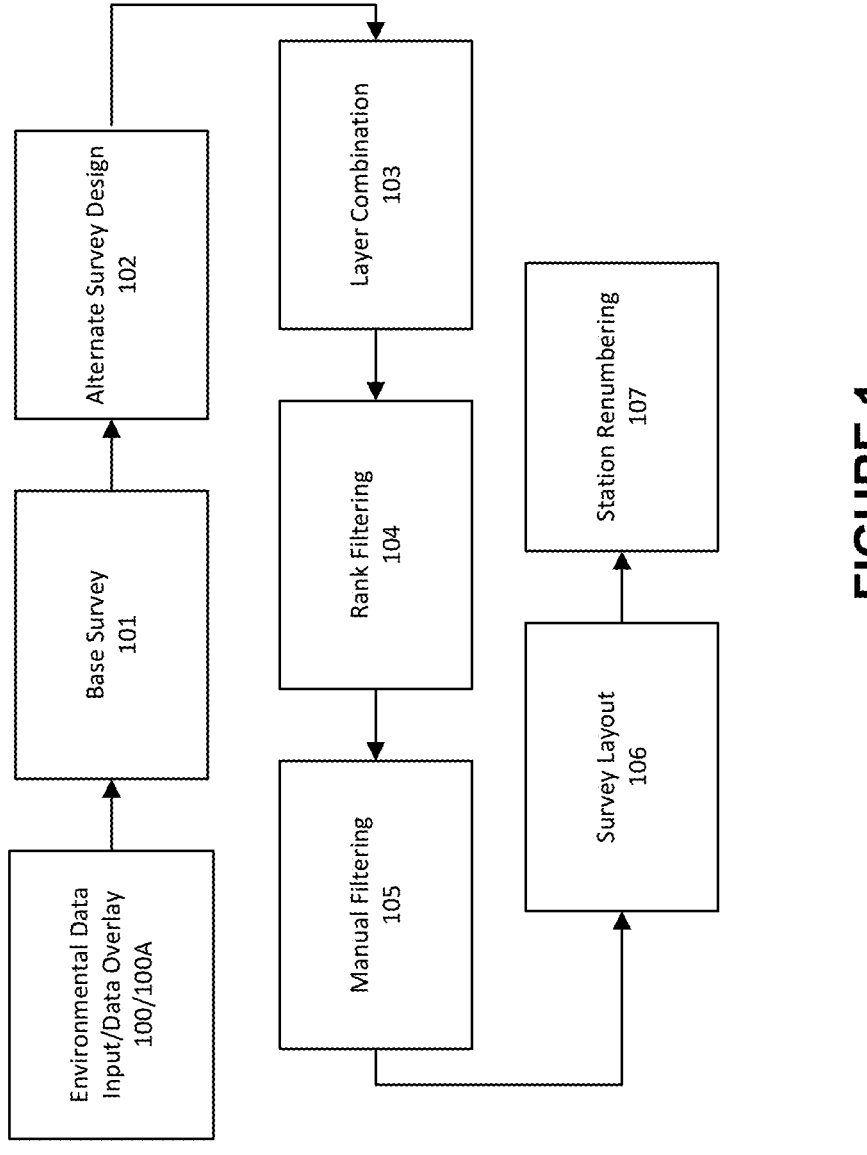
FIG. 1 is a flowchart showing seismic survey planning steps in accordance with one embodiment of the invention.

The systems and methods are described by a representative example of the process of designing a survey. As shown in FIG. 1, a seismic survey is designed through the following general steps and as described below. These include environmental and other surface and/or subsurface data input 100, base survey design 101, alternate geometry design 102, layer combination 103, rank filtering 104, additional filtering 105, survey layout 106 and station renumbering 107.

Step 100—Acquire Environmental Data for a Region

Figures 2, 2A, 2B:
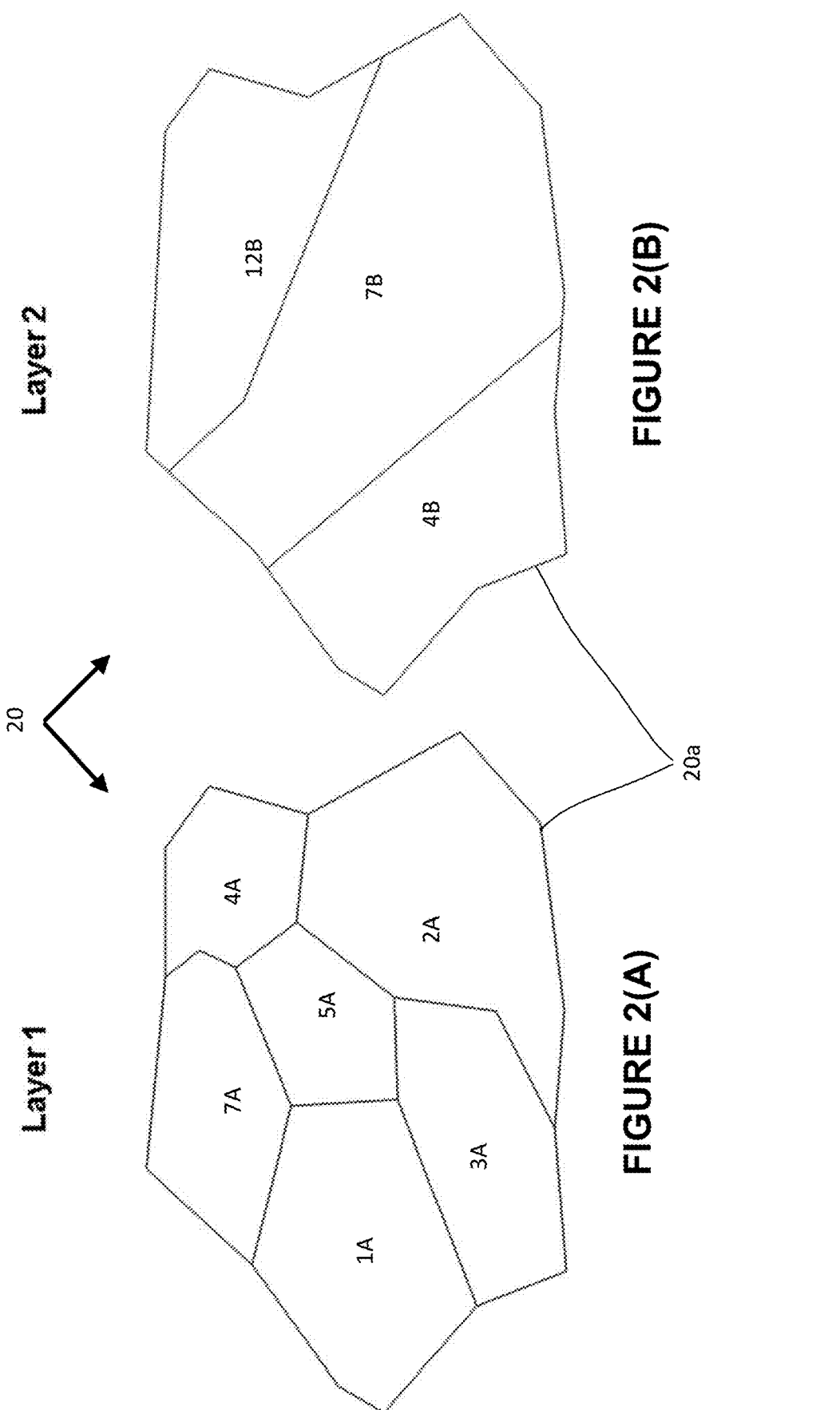
FIG. 2 is a schematic representation of a proposed survey area showing two layers (A) and (B) of environmental data.
FIG. 2A is a schematic representation of a proposed survey area showing two layers (A) and (B) of environmental data overlaid with one another.
FIG. 2B is an example of overlaid environmental data in a "real-world" example.
Figure 2A:
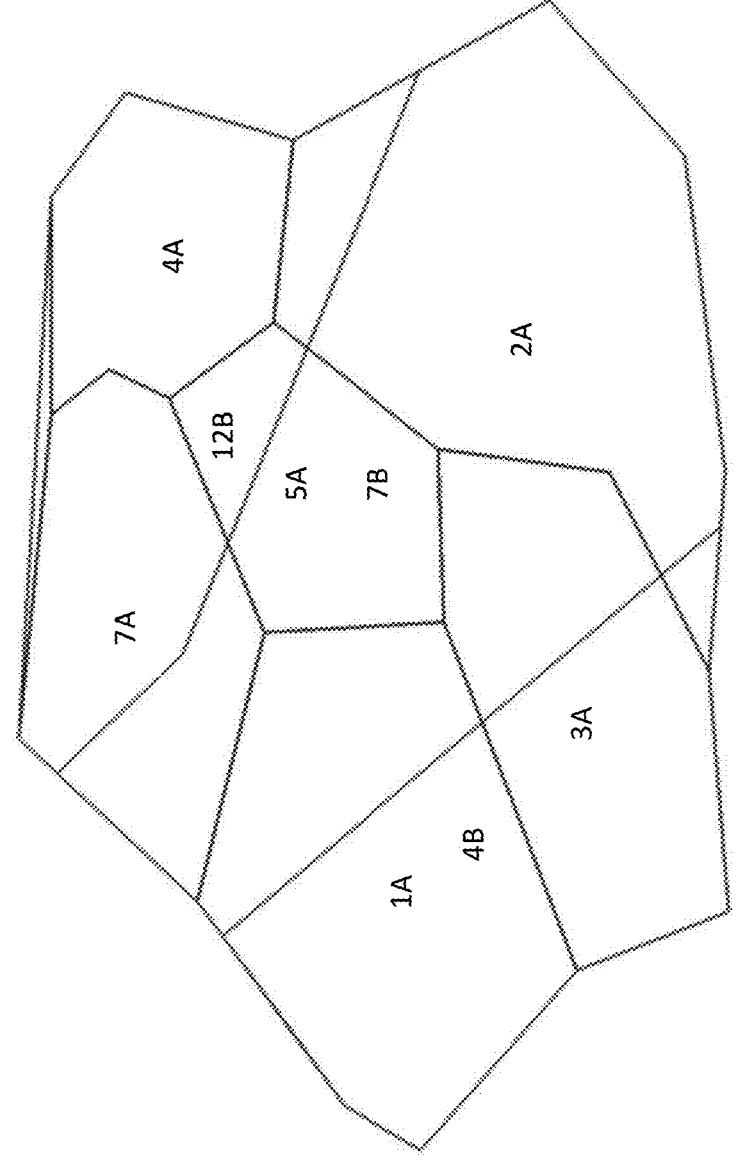
Figure 2B:
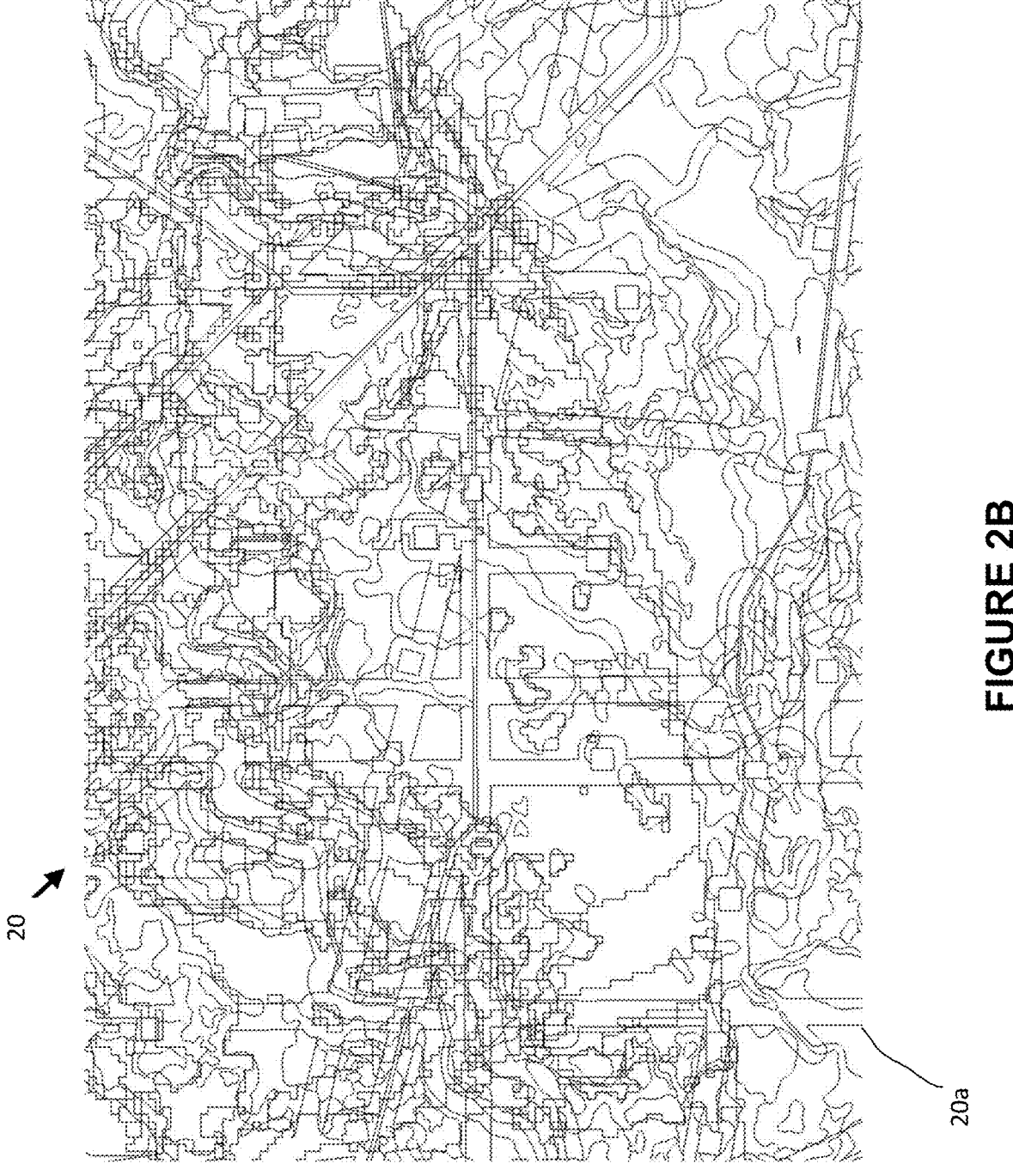

As shown in FIG. 2, a land area 20 to be surveyed is shown schematically. The boundary of the survey area is the outer perimeter 20a. The survey area includes a number of different zones shown as various polygons in FIGS. 2(A) and 2(B).

FIG. 2(A) shows a first layer of one type of environmental and/or other surface/subsurface data and FIG. 2(B) shows a second layer of another type of environmental and/or other surface/subsurface data, indicated as polygons within the same perimeter 20a.

For example, FIG. 2(A) may be illustrating "disturbance layer" data whereas FIG. 2(B) may be illustrating "caribou calving sensitivity" data. Each layer is shown divided into zones, with FIG. 2(A) showing 6 different disturbance zones as polygons within the perimeter 20a and FIG. 2(B) showing 3 different zones within the same area. Each zone is shown with a different "sensitivity" number or ranking number where a higher number is representative of greater environmental sensitivity or a relative ranking for that particular layer parameter.

For example, there are 6 marked zones in FIG. 2(A) with shown sensitivities 1A, 2A, 3A, 4A, 5A and 7A. Zone 1A is the least sensitive zone whereas Zone 7A is the most sensitive. As an example, Zone 1A may be a forested area of predominantly aspen trees whereas Zone 7A may be a fen (i.e. an environmentally sensitive wetland). Generally, certain forested areas may be less sensitive than a fen in terms of the ability to recover from an intrusion with survey personnel/equipment for source and receiver placement. That is, aspen trees are known to grow back rapidly when cut whereas a fen may take many decades to recover from an intrusion.

Zones 2A, 3A, 4A, 5A are areas with intermediary sensitivities, for example, 2A—coniferous forest, 3A—deciduous forest, 4A—shrub land and 5A—grassland and so on.

Figure 3:
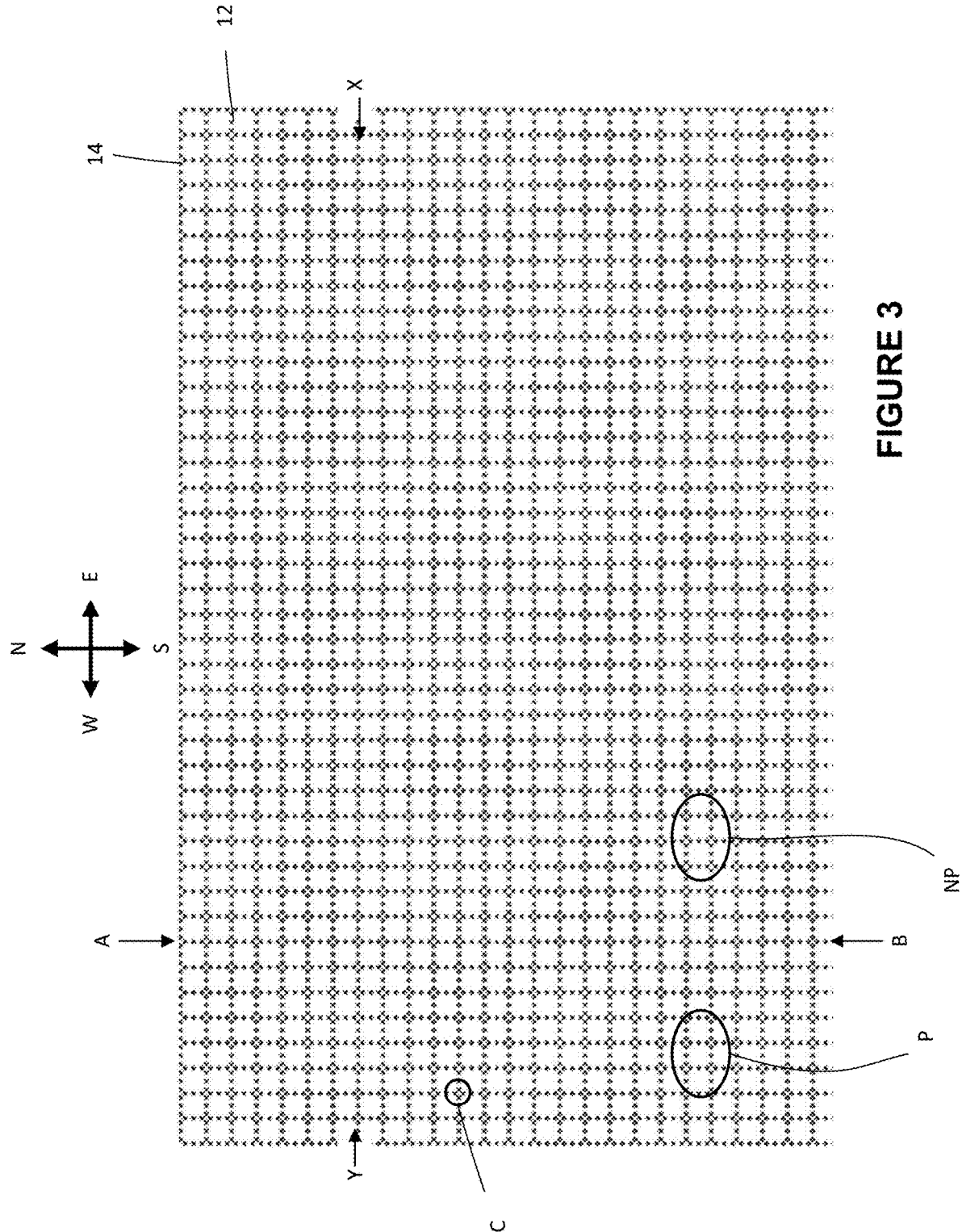
FIGS. 3 and 3A are an example of a base survey design.

Similarly, as shown in FIG. 2(B), 3 zones are illustrated namely, 4B, 7B and 12B showing "caribou calving sensitivity" data with the numbers representing increasing sensitivity. For example, zone 12B may be a zone where caribou are known to seasonally calve and therefore known to be an area of high sensitivity whereas the other zones are known to be less likely to see caribou calving.

Various types of environmental, surface, or subsurface data may be considered to include, but not limited to:

Vegetation regrowth potential
Seasonal or permanent wildlife presence/activity.
Number of species present
Waterways or other sensitive areas
Previously disturbed areas
Undisturbed areas
Greenhouse gas emission potential
Subsurface target zones of interest Step 100A—Overlay Data In step 100A, the different data/zones are overlaid on one another such that the polygons of each layer are overlaid with one another as shown in FIG. 2A. Such data is typically imported in "shapefile" format, but may be in other geographical information systems (GIS) formats.

Each data layer may be supplied from a range of sources where the different zones for that particular data type use different scales to represent different levels of sensitivity or ranking. Step 100A, will generally also normalize the scale range for each data layer, such that the number used to describe ranking is normalized to a common scale for each data layer. For example, layer 2 depicts one zone with a "12" ranking. Thus, if it is desired that the ranking scale across all layers is 1-10, the layer 2 data would be normalized to a scale of 1-10 where the ranking number "12B" (which may be the highest ranking number for that data type) would be adjusted to, for example, "10B" as shown in FIG. 2A.

Accordingly, in this example, the highly sensitive calving zone 12B is overlaid with "moderately" sensitive regrowth zones 7A, 5A, 4A and "low" sensitivity area 2A.

A representative example of "real-world" data with multiple layers of data is shown in FIG. 2B which depending on the number of layers being implemented can be complex.

Step 101—Create Base Survey

Figure 3A:
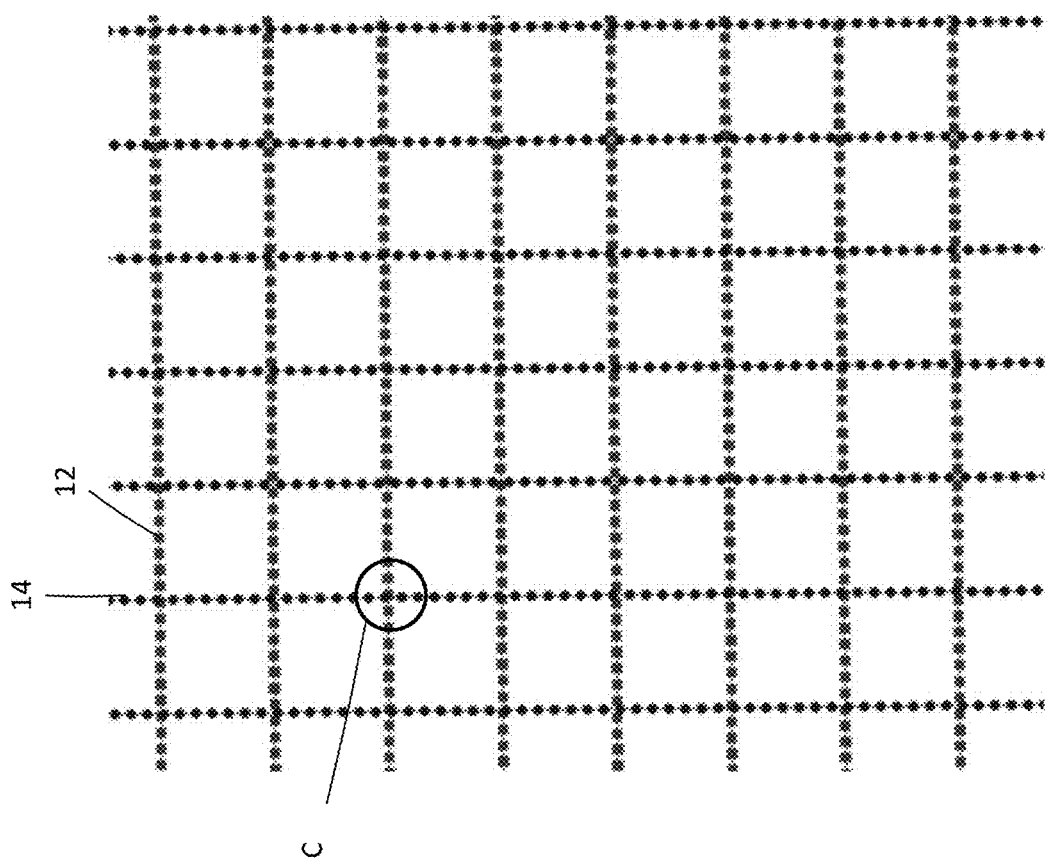

As shown in FIGS. 3 and 3A, initially, a base survey plan is created for the survey area in which a standard survey of sources 12 and receivers 14 is laid out in an orthogonal grid. As shown, the source lines 12 run east-west and the receiver lines run north-south and represent/illustrate the cut-lines that would be required to conduct a standard survey. The spacing between parallel cut-lines and the number sources and receivers along each cut-line can be adjusted as can the configuration of the lines (continuity, angle, regularity, etc.). Other base survey layouts may be slant or megabin and/or any other conventional geometry.

The base survey plan as shown in FIG. 3 does not take into account any environmental, surface, or subsurface data at this point. For the purposes of illustration, a cut-line XY would thus extend continuously from X to Y (e.g. east-west) and the cut-line AB would extend continuously from A to B (e.g. north-south) thus, providing clear passageway between each point if a corresponding cut-line was made. In addition, at cross-over points (e.g. C), there is clear passageway from one direction to another.

Step 102—Alternative Geometry

Figure 4:
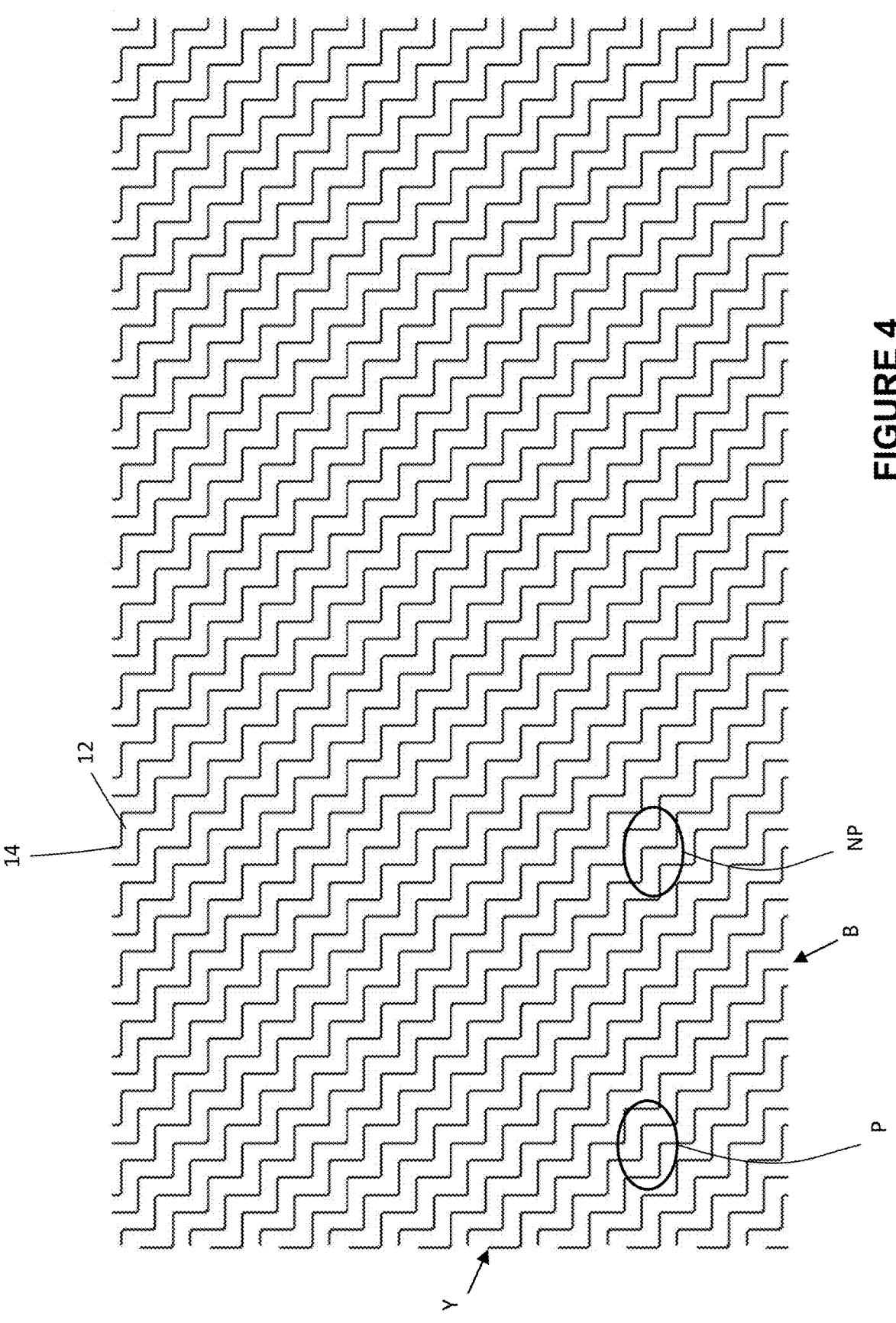
FIGS. 4 and 4A are an example of an alternate geometry design showing non-orthogonal seismic lines.
Figure 4A:
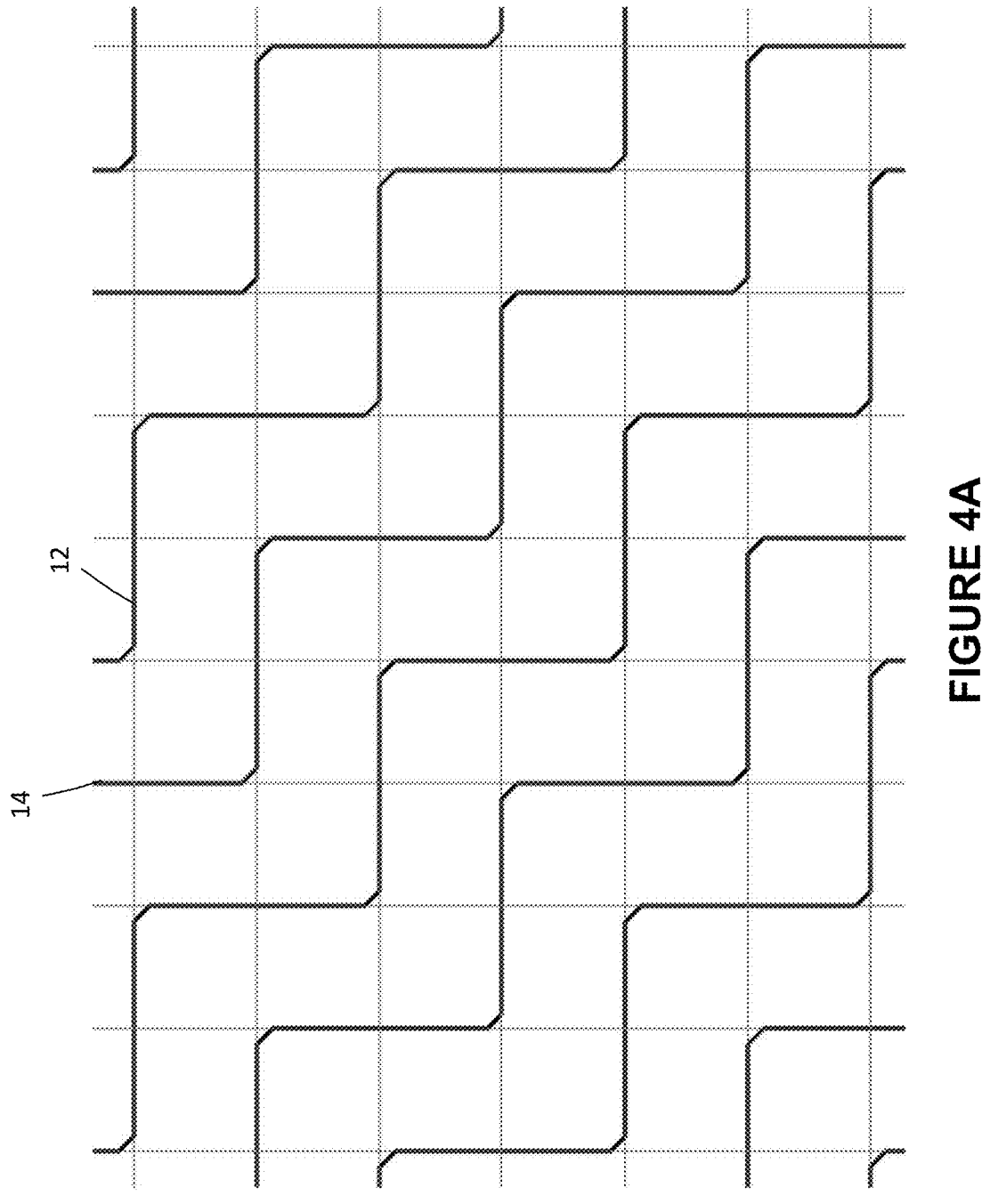

As shown in FIGS. 4 and 4A, alternate geometries can be designed that prevent straight cut-lines across the area. In FIG. 4A, 50% of the source and receivers have been removed from the base survey such that the cut-lines form a zig-zag pattern across the area. For example, from point B to Y, a zig-zag cut-line is formed. The zig-zag cut-line may include various combinations of sources and receivers, for example a number of North-South aligned receivers may alternate with a number of East-West aligned sources with a 90 degree turn between each set. As such, the resulting zig-zags do not cross one another with the result being that there is undisturbed vegetation between each zig-zag which thereby reduces the length of all lines-of-sight and does not enable, for example, movement of wildlife from one zig-zag to the other without crossing "undisturbed" land. Thus, a comparison of the base survey design as shown in FIG. 3 and the alternative geometry design of FIG. 4, shows the effect of different cut-lines on the potential interaction of predators P (e.g. wolves) and non-predators NP (e.g. caribou). As shown in FIG. 3, predators P can sight from a longer distance along the cut-lines and also more readily move from predator location to non-predator location along a cut-line, whereas in FIG. 4, the predators cannot sight as far and must move through undisturbed land to get to the NP location. Predation advantages based on wind direction would also be diminished as wind energy would be scattered rather than channeled down cut-lines.

Alternate geometries will have affects on the total length of cut-lines and variations in the patterns of placing sources and receivers can be adjusted as well as the number of sources and receivers along given cut-lines. The final determination of the patterns and the sources and receivers may further take into account the effects of certain patterns and source/receiver numbers on the quality of the seismic data that is ultimately collected when the survey is undertaken.

Thus, a design as shown in FIGS. 4 and 4A provide advantages over a base survey design in terms of reduced number of lines, shorter line segments and may also include a smaller number of sources and receivers which will lead to reduced costs and environmental impact.

Step 103—Apply Weighting Factors

Figure 5:
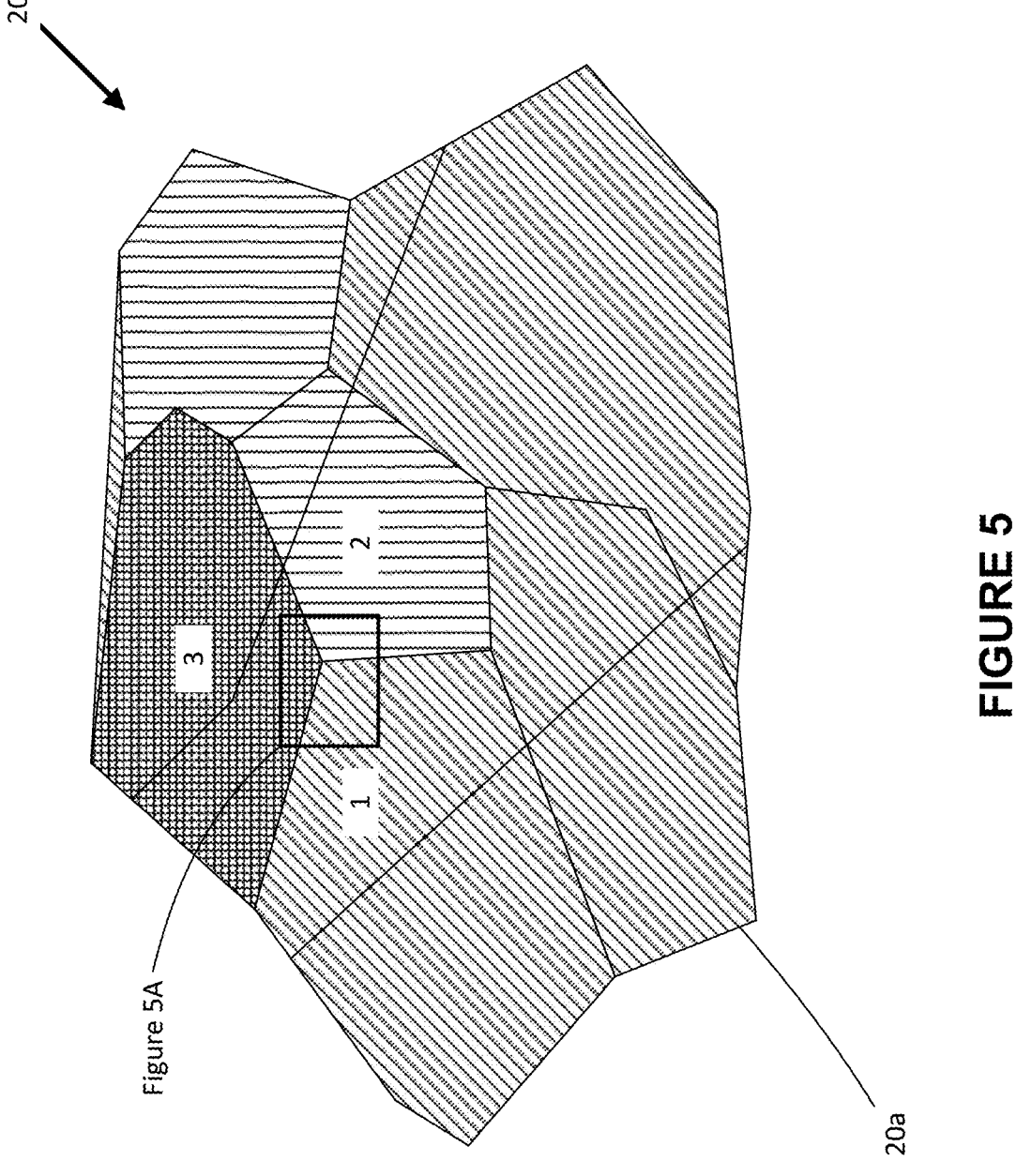
FIG. 5 is a schematic representation of the process by which weighting factors are applied to different layers of environmental data.
Figure 5A:
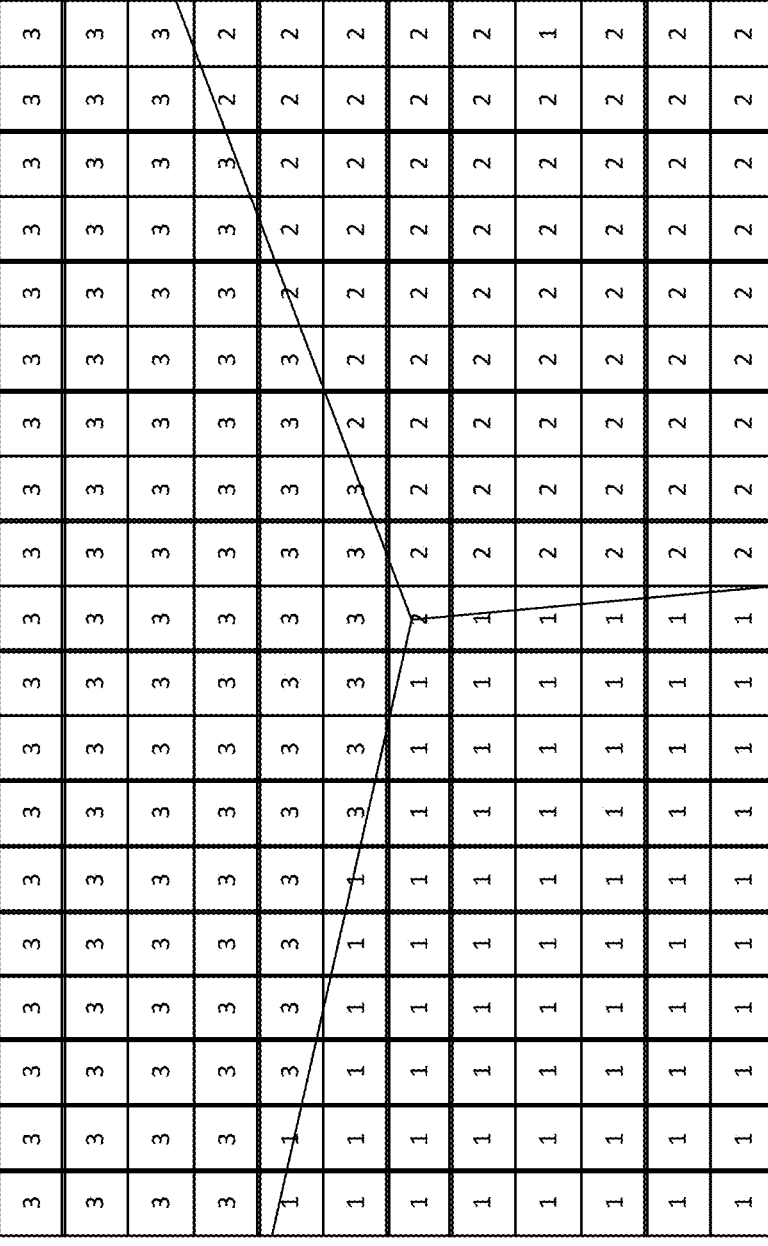
FIG. 5A is an enlarged view showing assigned area rankings based on applied weighting factors.

As shown in FIGS. 5 and 5A, weighting factors are next applied to the overlaid data wherein each layer of data can be assigned a relative importance in comparison to other data layers. For example, in an area where the differences in environmental sensitivity may be relatively small, each layer of data may be assigned a substantially equal weighting. That is, in areas where there are little known/anticipated wildlife issues, and/or the absence of particularly sensitive land, each data layer may be considered as substantially equally important to each other.

In contrast, there may be a relatively important layer of data, for example, caribou calving data. FIG. 5 shows an example where the layer 1 data has been assigned a 75% weighting and layer 2 data has been assigned a 25% weighting such that for a given area (e.g. a 0.5 sq km resolution), the combination of the ranking of a particular zone in one layer is weighed and summed with the weighted sensitives for other data layers.

For example, as shown in Table 1, a weighted ranking for a given area is illustrated.

TABLE 1

| Weighted Analysis for Defined Area | | | |
| --- | --- | --- | --- |
| Layer | Normalized Ranking (A) (Scale 1-10) | Assigned Weighting to Data Layer (%) (B) | Weighted Ranking A * B |
| 1 | 8 | 70 | 5.6 |
| 2 | 5 | 15 | 0.75 |
| 3 | 1 | 5 | 0.05 |
| 4 | 4 | 10 | 0.4 |
| Total: | | | 6.8 |

Upon determination of a weighted ranking, a defined number of ranges may be defined for the weighted sensitivities. For example, in the example of Table 1, 3 ranges may be defined, 0-2.5, >2.5-5, and >5 wherein each defined range is used to determine the geometry of the survey.

As shown in FIGS. 5 and 5A, weighted sensitivities are determined for a defined area within each zone wherein at the intersection of 3 zones as shown, a different value has been assigned for defined land areas wherein, in this case, 3's represent a more sensitive area that requires a more sensitive survey design, and 1's represent a less sensitive that enables a less sensitive survey design. Application of this analysis a real-world land area is shown in FIG. 5B.

Steps 104 and 105—Filtering

Figure 5B:
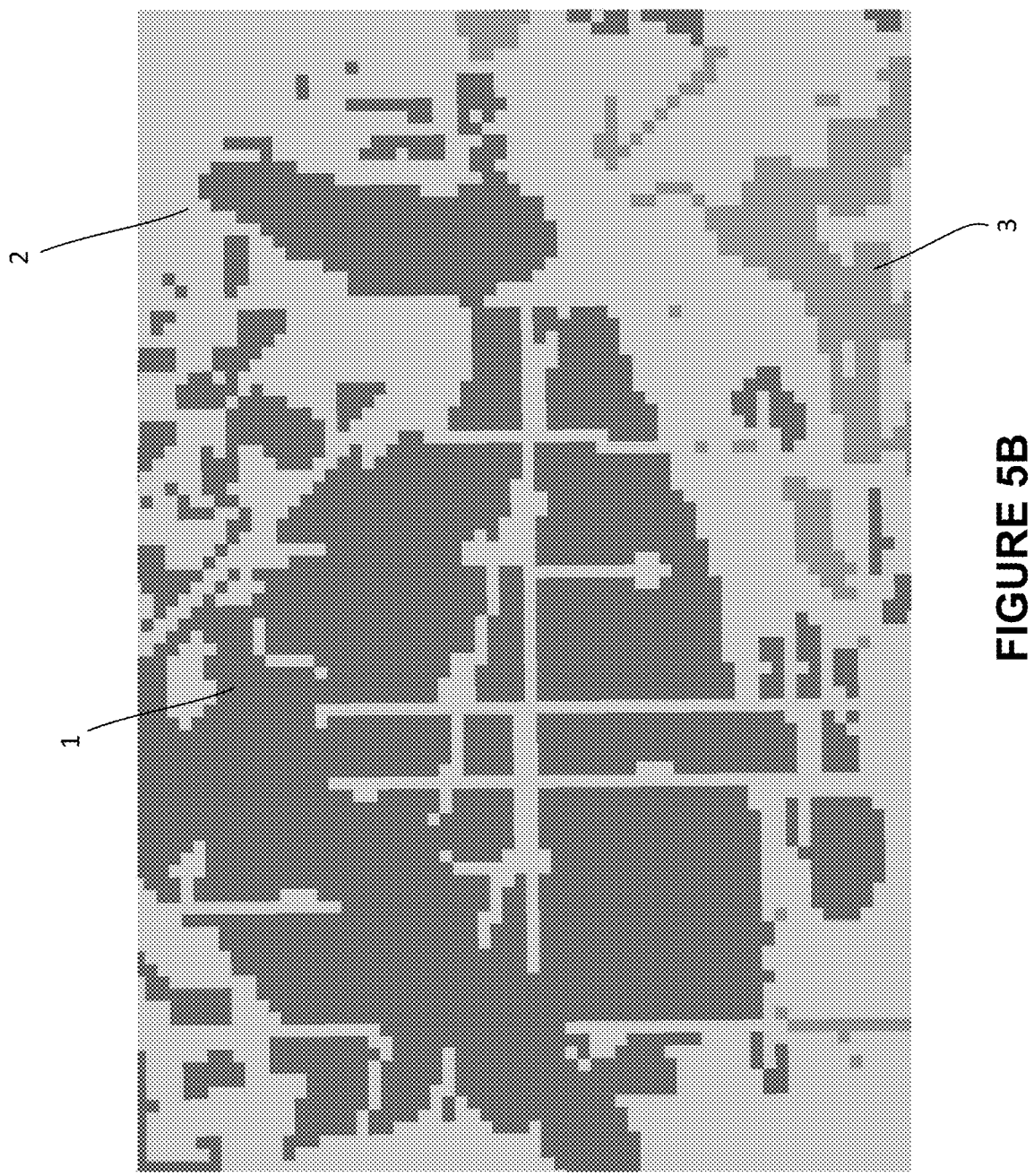
FIG. 5B is an example of layer combination in a real-world example.
Figure 6:
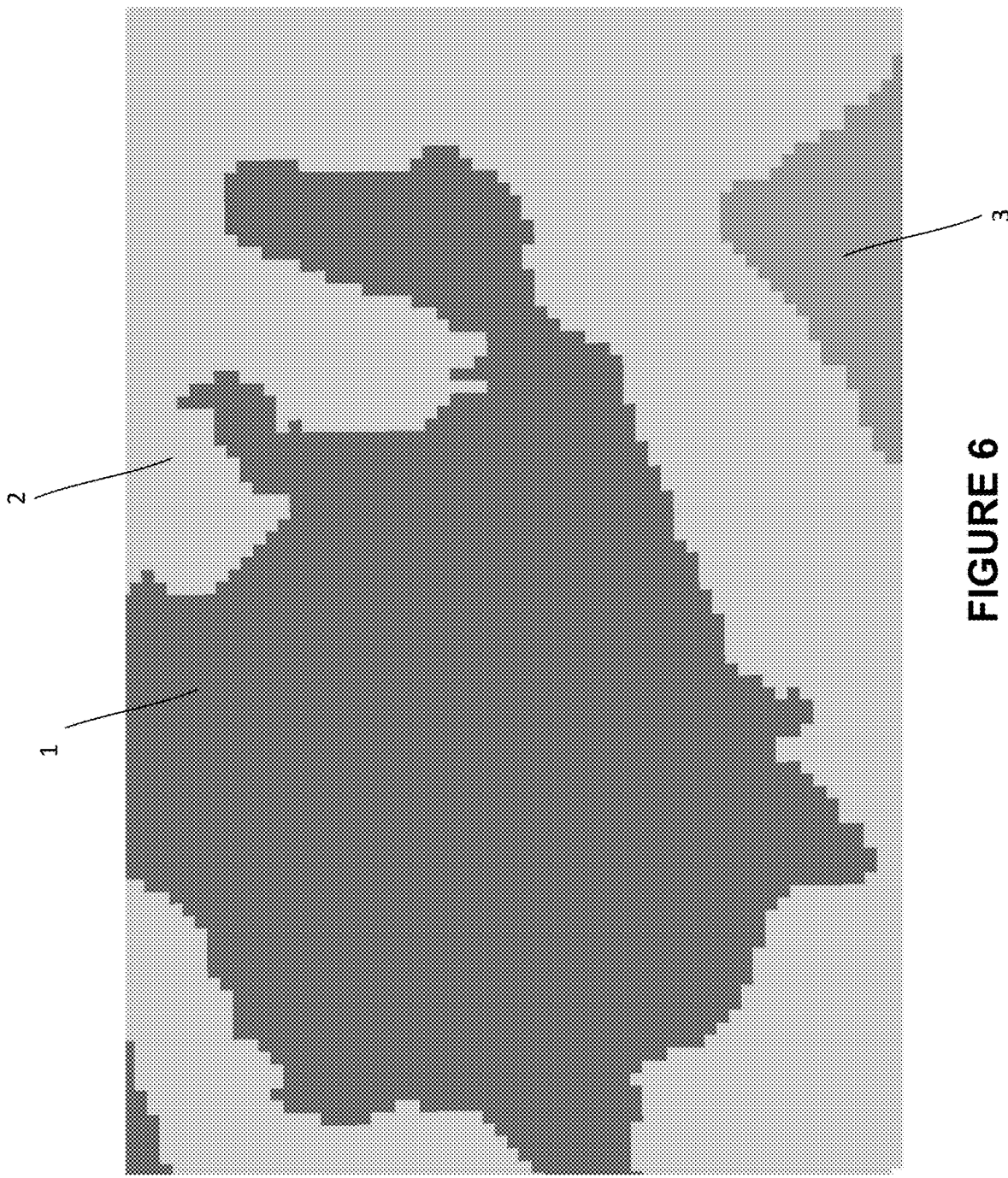
FIG. 6 is an example of a real-world survey design after filtering.

As shown in FIG. 5B, the number of boundaries between proposed survey designs may be excessive; hence, filtering may be applied as shown in FIG. 6, where the resolution is decreased in order to decrease the relative complexity of the final survey design. Manual filtering may also be applied if an operator wishes to manually adjust the resolution based on their assessment of the particulars of a land area.

Step 106—Finalize Survey Plan

Figure 7:
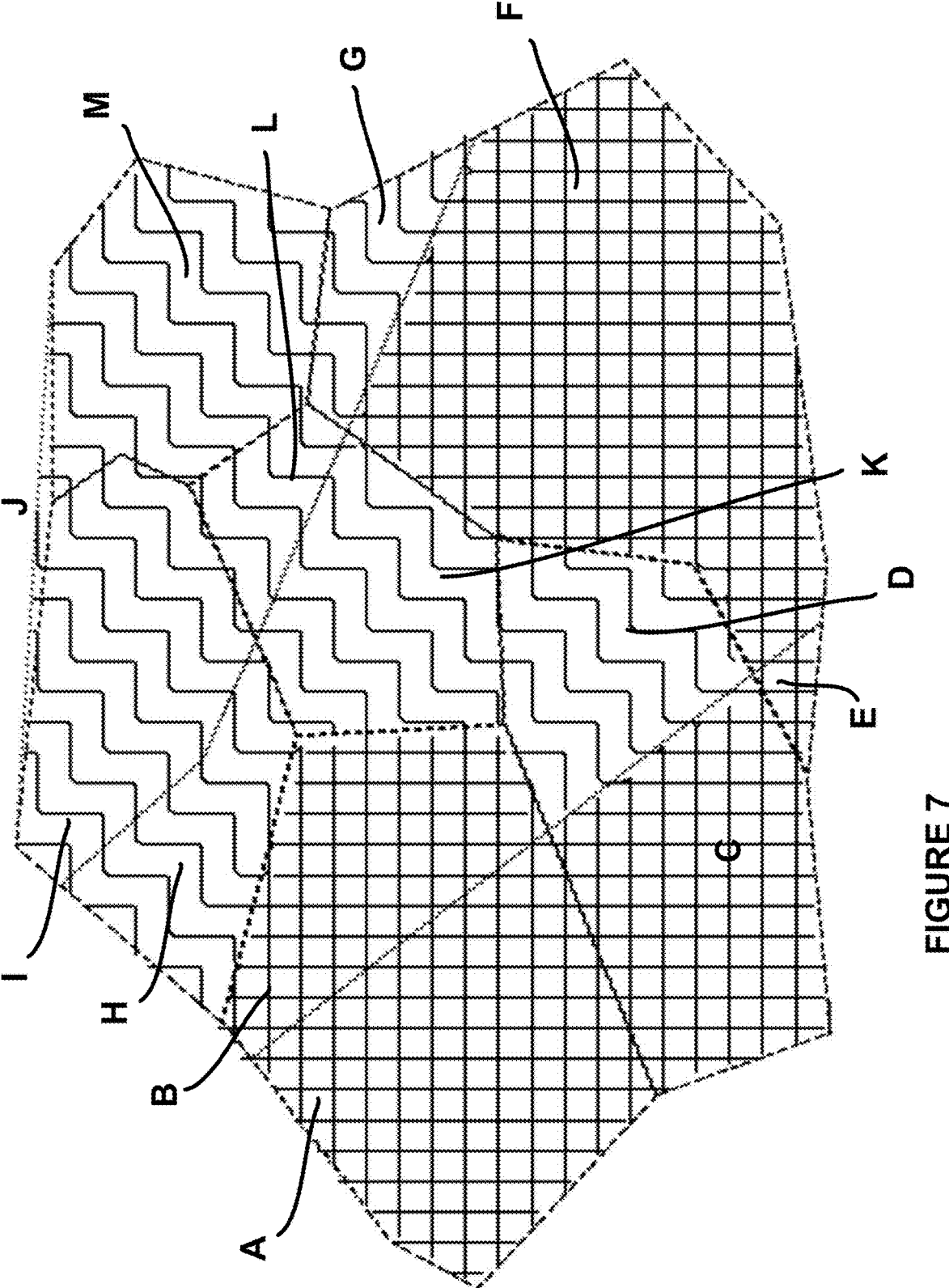
FIGS. 7 and 7A are schematic representations of the application of different survey designs applied to a survey area after weighting.
Figure 7A:
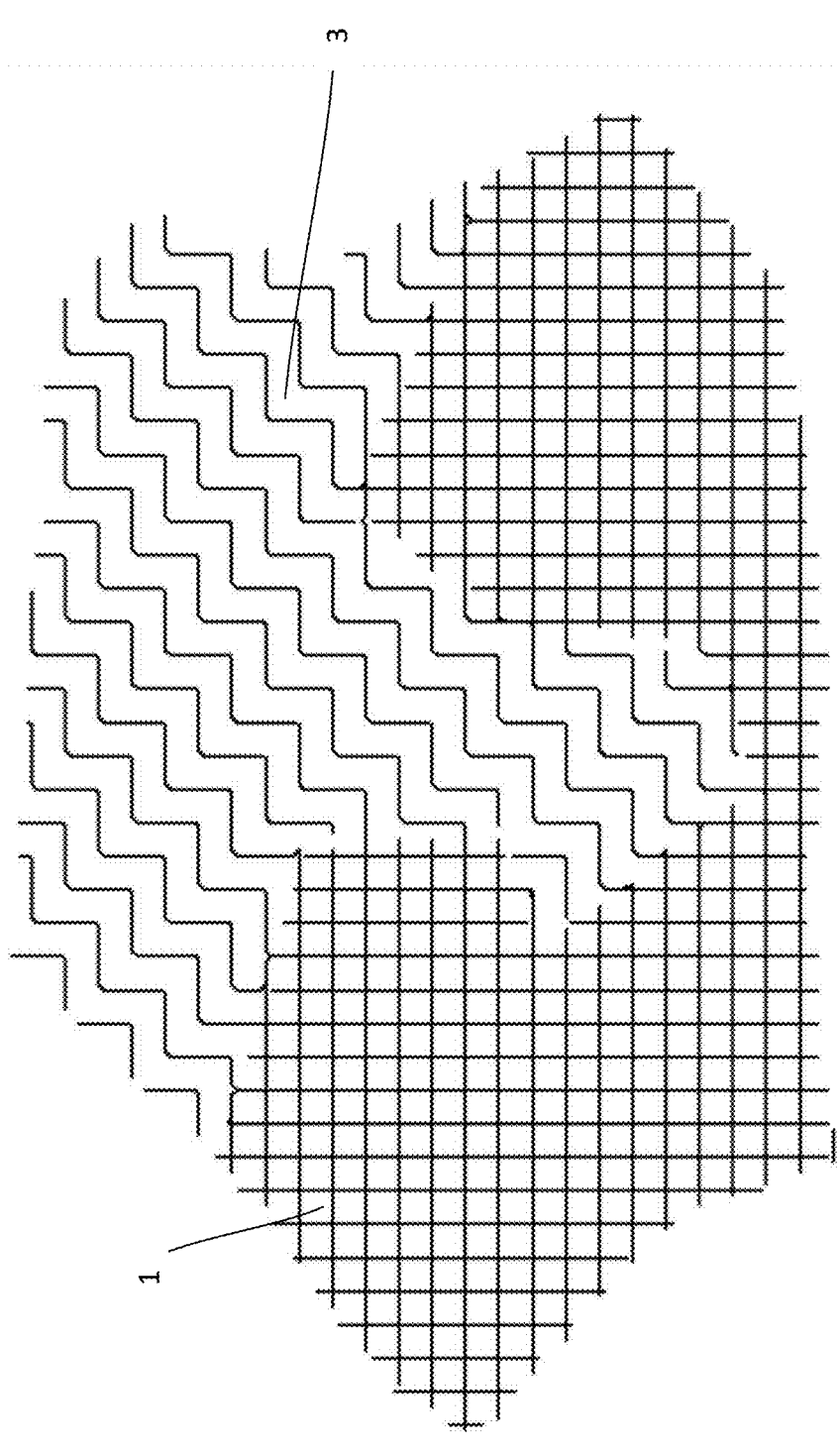
Figure 7B:
FIG. 7B is an example of different survey designs applied to a real-world example with an enlargement showing transitions between different survey designs.

As shown schematically in FIG. 7, plans for different survey designs are then applied to each zone. For example, if it was determined that polygons A-G were not sensitive areas, a base survey may be planned for those areas, whereas for polygons H-J, sensitive areas were identified wherein a zig-zag design may be appropriate and for polygons K-M, the most sensitive areas were identified wherein a survey design with less-impactful cut-lines is deemed to be appropriate. A final survey plan without polygons is shown in FIG. 7A and a representative final survey for a real-world area is shown in FIG. 7B.

Steps 107 and 108—Station Renumbering

Finally, each source and receiver station may be renumbered to avoid numbering conflicts between stations within the different survey designs and may implement numbering based on a logical progression through different areas.

From this information about the native landscape and the environmental factors, the methodology:

can be implemented to minimize the total amount of forest that is cut to accommodate seismic crews both in terms of linear kilometers and square kilometers.

can be implemented to minimize the amount of interconnectivity through the survey area in order to make it more inconvenient for predators (and humans) to travel through the area when the area starts to regrow after the survey.

can be implemented in non-forested areas to minimize the amount of disturbance to seismic equipment deployment.

can be implemented to take account of immediate and future greenhouse gas emissions.

can be implemented to reduce costs of acquiring seismic.

Other Features

In the design of a survey, it is important that the source/receiver density is adequate to image the subsurface target of interest. The base survey provides a starting point to selectively move/delete sources and receivers having consideration to the environmental and other surface/subsurface data.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A seismic survey method comprising the steps of:

for a defined land and/or marine area:

a) obtaining two or more data sets for the defined land and/or marine area wherein each data set includes relative ranking values for sub-zones within the defined area;

b) over-layering the two or more data sets;

c) for a defined resolution of the over-layered data sets, applying a weighting factor to each relative ranking value for each data layer and summing weighted ranking values across all over-layered data sets to determine a combined weighted ranking value for the defined resolution; and d) generating a seismic survey design having a plurality of survey geometries for the defined area, wherein a survey geometry selected from the plurality of survey geometries is applied to each sub-zone within the defined area according to the combined weighted ranking value determined for each sub-zone at the defined resolution.

2. The method as in claim 1 further comprising a step of filtering combined weighted ranking values into two or more categories and applying a different survey geometry of the plurality of survey geometries to each category.

3. The method as in claim 1 wherein the plurality of survey geometries is applied to correlate sub-zones having larger combined weighted ranking values to a survey geometry having less disturbance as compared to sub-zones having smaller combined weighted ranking values to a survey geometry having more disturbance.

4. The method as in claim 3 wherein the plurality of survey geometries is applied to correlate sub-zones having larger combined weighted ranking values to a survey geometry having fewer sources and receivers as compared to sub-zones having smaller combined weighted ranking values to a survey geometry having more sources and receivers.

5. The method as in claim 1 wherein the plurality of survey geometries is selected from survey geometries including:

a) orthogonal and separate source and receiver lines having intersecting lines between the source and receiver lines;

b) non-linear source and receiver lines having non-intersecting lines between adjacent non-linear lines; and wherein the plurality of survey geometries are ordered from least sensitive to most sensitive.

6. The method as in claim 1 further comprising a step of filtering the survey design to reduce complexity of transitions from one survey geometry to another.

7. The method as in claim 6 wherein the step of filtering the survey design comprises decreasing the defined resolution.

8. The method as in claim 1 further comprising steps of:

placing a plurality of sources and a plurality of receivers across the defined area in accordance with the generated seismic survey design; and running a seismic survey of the defined area by operating the plurality of sources and the plurality of receivers.

9. The method as in claim 1 wherein the step of applying a weighting factor is applied so as to apply a higher weighting factor to a higher prioritized data set and apply a lower weighting factor to a lower prioritized data set.

10. The method of claim 9 wherein the higher prioritized data set is prioritized based on one or more of the following factors: environmental sensitivity, reduced tree cutting, cost savings, time savings, reduced animal habitat disturbance.

11. The method as in claim 1 wherein the step of generating the seismic survey design for the defined area further includes starting with a base survey design having a conventional geometry comprising a grid covering the defined area, and then removing one or more source and receiver stations from the grid to generate the seismic survey design.

12. The method as in claim 11 wherein the conventional geometry of the base survey design is a regular and well-sampled geometry.

13. The method as in claim 12 wherein the regular and well-sampled geometry is selected from a group comprising: orthogonal geometry, carpet geometry, slant geometry.

14. The method as in claim 11 wherein the generated seismic survey design comprises a regular distribution of source and receiver stations.

15. The method as in claim 14 wherein the generated seismic survey design comprises source and receiver stations connected along a regular distribution of lines, the lines selected from one or more of: parallel lines, non-linear lines.

16. The method as in claim 14 wherein the generated seismic survey design comprises source and receiver stations connected along an irregular distribution of lines, the lines selected from one or more of: parallel lines, non-linear lines.

17. The method as in claim 11 wherein the generated seismic survey design comprises an irregular distribution of source and receiver stations.

18. The method as in claim 17 wherein the generated seismic survey design comprises source and receiver stations connected along a regular distribution of lines, the lines selected from one or more of: parallel lines, non-linear lines.

19. The method as in claim 17 wherein the generated seismic survey design comprises source and receiver stations connected along an irregular distribution of lines, the lines selected from one or more of: parallel lines, non-linear lines.

* * * * *